United States Patent Office 3,012,066
Patented Dec. 5, 1961

3,012,066
PRODUCTION OF DIMETHYL TEREPHTHALATE
Alan Ryton Caverhill, Robert Reid Coats, and Elias Isaacs, all of Harrogate, England, assignors to Imperial Chemical Industries Limited, London, England, a corporation of Great Britain
No Drawing. Filed Mar. 16, 1959, Ser. No. 799,458
Claims priority, application Great Britain Mar. 21, 1958
2 Claims. (Cl. 260—475)

This invention relates to an improved method for the continuous production of esters of aromatic dicarboxylic acids with lower aliphatic alcohols.

Esters of aromatic dicarboxylic acids have recently assumed considerable importance as chemical intermediates in the field of polyester manufacture. Amongst these esters alkyl terephthalates are most prominent since they are readily brought to a state of high purity and may be conveniently reacted to yield diol esters by ester-interchange. This process which is described in British Patent 578,079, is now widely used in commercial practice.

The normal process of esterification comprises reaction of the acid with a small excess of alcohol at the boil, a dehydrating catalyst such as sulphuric acid generally being present. In the case of terephthalic acid, however, this procedure is unsatisfactory because of its extremely low solubility in alcohols. To obtain a reasonable rate of reaction a very great excess of alcohol would be required so that such a process would not be satisfactory from a manufacturing viewpoint. A number of methods are described in the prior art by means of which such difficulties may be overcome. United States Patent 2,459,014 deals with the reaction of terephthalic acid and methanol in the presence of sulphuric acid under superatmospheric pressure above the boiling point of methanol; British Patent 758,423 claims a method for the continuous production of aromatic carboxylic acid esters by passing the acid and alcohol countercurrent through a column reactor at elevated temperature and pressure while British specification 783,017 describes a non-catalytic liquid phase process for the production of terephthalic acid methyl esters under superatmospheric pressure and at a temperature above 150° C. the water content of the reaction mixture being restricted to below 30% by weight.

These methods suffer from certain disadvantages. For example, the corrosive effect of sulphuric acid is much increased by more drastic thermal conditions while a bubble plate reactor such as that reproduced in British Patent 758,423 would be very costly if required to operate at very high temperatures and pressures. Moreover, a limitation is imposed on countercurrent reaction by the critical temperature of the alcohol concerned. Above this temperature the process will not operate. For example, countercurrent reaction between methanol and an aromatic acid would not be possible above ca. 240° C. The rate of reaction is therefore restricted in this way. Superatmospheric pressure reaction between methanol and terephthalic acid in the absence of a catalyst does not readily go to completion especially if appreciable amounts of water are retained. The amount of monomethyl terephthalate produced after reasonable times of reaction are inconveniently large unless a considerable excess of alcohol is used.

We have found, particularly with methanol, that very good results are obtained when esterification is carried out in two stages. In the first stage the aromatic dicarboxylic acid and the alcohol are passed concurrently through a tubular reactor at a temperature in excess of 240° C. This is followed by an intermediate stage in which residual alcohol and water are stripped from the products of stage one before these are again passed through the same, or a second similar reactor after the addition of fresh alcohol. Alternatively the second stage may comprise countercurrent interaction of the products of stage one with alcohol vapour below the critical temperature of the alcohol, this being carried out in a bubble-cap column type reactor.

According to the present invention we provide a process for the continuous production of dimethyl esters of aromatic dicarboxylic acids, particularly terephthalic acid, which comprises two successive stages characterised in that in stage (1) an aromatic dicarboxylic acid and methanol are reacted concurrently at a temperature above 240° C. and in stage (2) the products of stage (1), from which water has been removed are reacted with fresh methanol either in concurrent fashion as in stage (1) or in countercurrent fashion at a temperature not exceeding 240° C.

A suitable type of reactor for the first stage is one consisting simply of narrow tubes. This may be fabricated comparatively easily and cheaply to operate under high pressures and temperatures. When two concurrent reactions are carried out this type of reactor is suitable for both and it is possible to use the same reactor for the two steps. If it is desired to carry out the second stage by the countercurrent technique a small bubble-plate column reactor is required for this step.

It is preferred to carry out the two stage process so that the reaction is taken to at least 85% total esterification during the first stage at the highest possible temperature and pressure. The drastic conditions are conveniently operated in the tubular reactor. A further passage through this same or a second tubular reactor under similar conditions using fresh methanol should then bring esterification to at least 98% completion. On the other hand the second stage may be carried out in the column type reactor but at appreciably lower temperatures and pressures than those in stage one.

The example which follows, wherein percentages are by weight, is provided for the purpose of illustrating our invention:

*Example*

Terephthalic acid and methanol in weight ratio 1:4 passed concurrently down a tubular reactor at 300° C. and pressure 2650 p.s.i. with dwell time 20 mins. yield some 85% dimethyl terephthalate, the residue being mainly the half methyl ester. Conversion to at least 98% dimethyl terephthalate may be achieved by either:

(1) Allowing the residual methanol plus water to flash-off then adding fresh methanol equal in quantity to that originally charged before passing the mixture through the reactor under the same conditions as before, or (2) Flowing the reaction products down a bubble-cap column reactor of 6 theoretical plates up which superheated methanol is passing at 220° C. The dwell time of the reactants in the column is 2½ hours, the rate of dry methanol supplied to the column foot being adjusted to give a concentration at least twice that of the wet methanol entering at the top.

To facilitate the dwell time of the reactants in the column provision may be made to allow the reactants to pass between each plate and a small separate reaction vessel. In this way the hold-up of the column is increased.

What we claim is:

1. A continuous process for the production of dimethyl terephthalate which consists of (1) reacting concurrently terephthalic acid with methanol at a temperature above 240° C., removing water from the reaction mixture, and (2) treating the resulting reaction mixture with fresh methanol under the conditions in step (1).

2. A continuous process for the production of dimethyl terephthalate which consists of (1) reacting concurrently terephthalic acid with methanol at a temperature above 240° C., removing water from the reaction mixture, and (2) countercurrently treating the resulting reaction mixture with fresh methanol vapor at a temperature of at most 240° C.

References Cited in the file of this patent
UNITED STATES PATENTS

| | | |
|---|---|---|
| 2,618,651 | Page et al. | Nov. 18, 1952 |
| 2,766,273 | Bruins et al. | Oct. 9, 1956 |
| 2,813,891 | Billing | Nov. 19, 1957 |
| 2,885,432 | Broich et al. | May 5, 1959 |
| 2,976,030 | Meyer | Mar. 21, 1961 |